Dec. 7, 1965  F. R. GREENE  3,221,353
METHODS OF SHOE MANUFACTURE USING A RADIO
FREQUENCY DIELECTRIC HEATER
Filed July 31, 1961  2 Sheets-Sheet 1
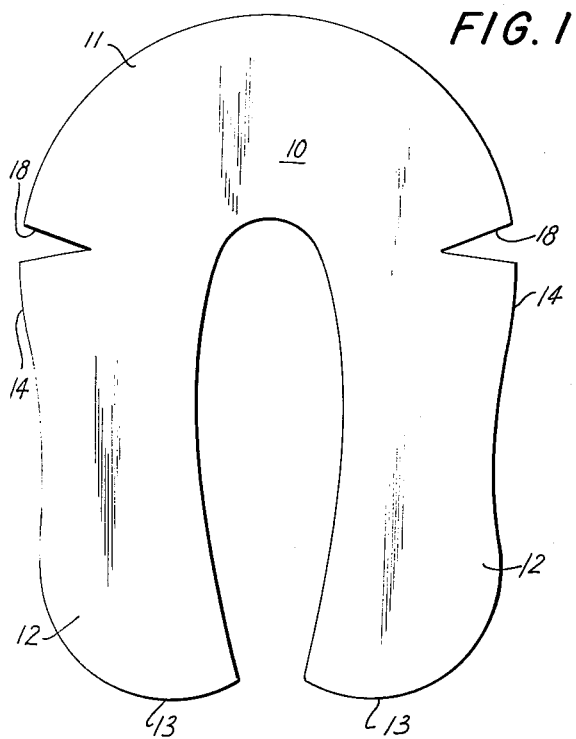
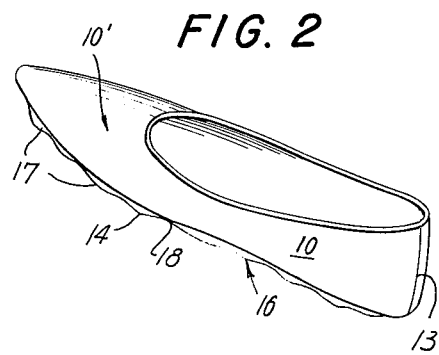
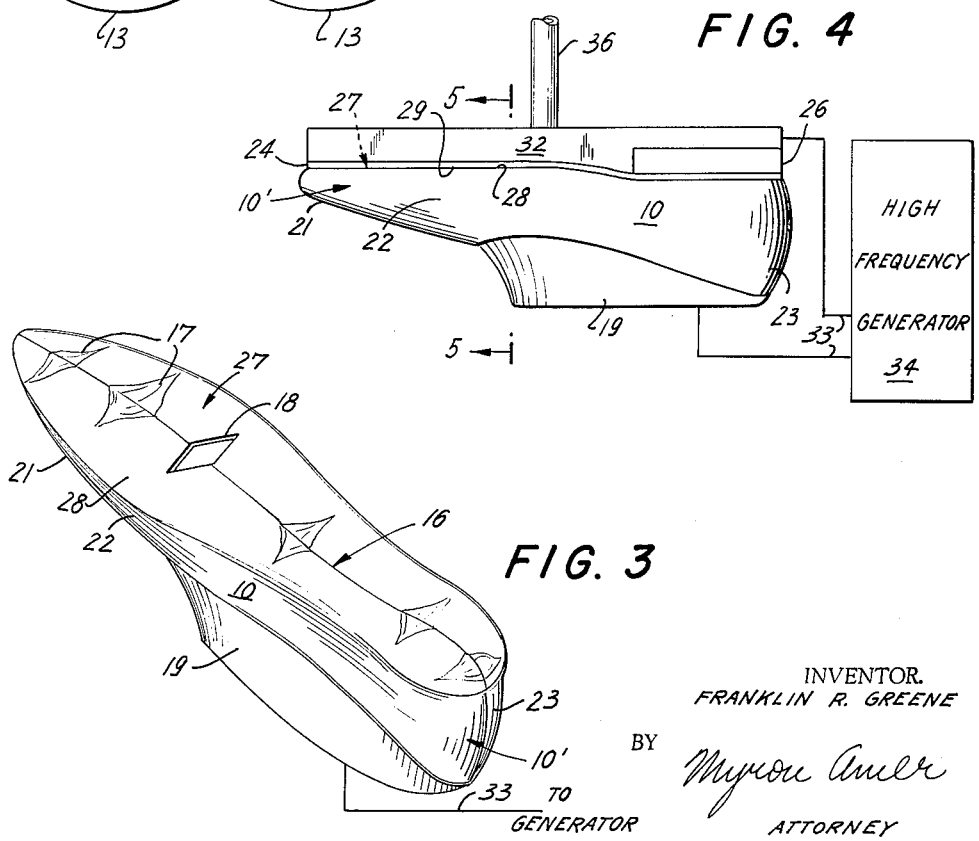
INVENTOR.
FRANKLIN R. GREENE
BY Myron Amer
ATTORNEY Dec. 7, 1965　　　　　F. R. GREENE　　　　3,221,353
METHODS OF SHOE MANUFACTURE USING A RADIO
FREQUENCY DIELECTRIC HEATER
Filed July 31, 1961　　　　　　　　2 Sheets-Sheet 2
FIG. 6
FIG. 5
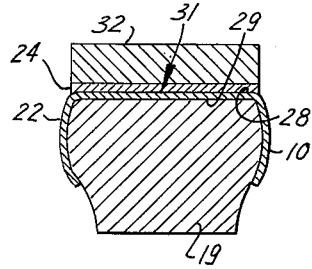
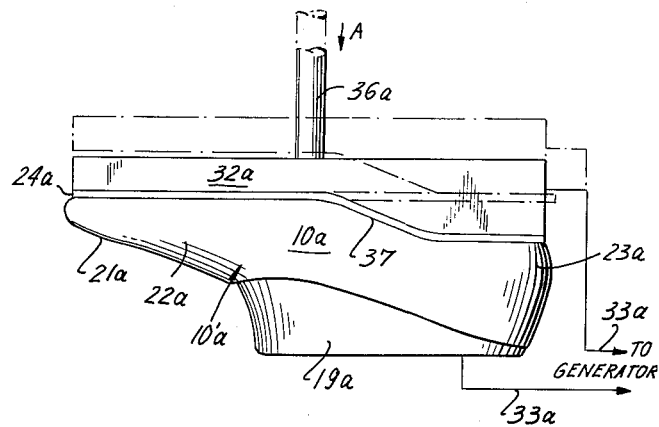
FIG. 7
FIG. 8
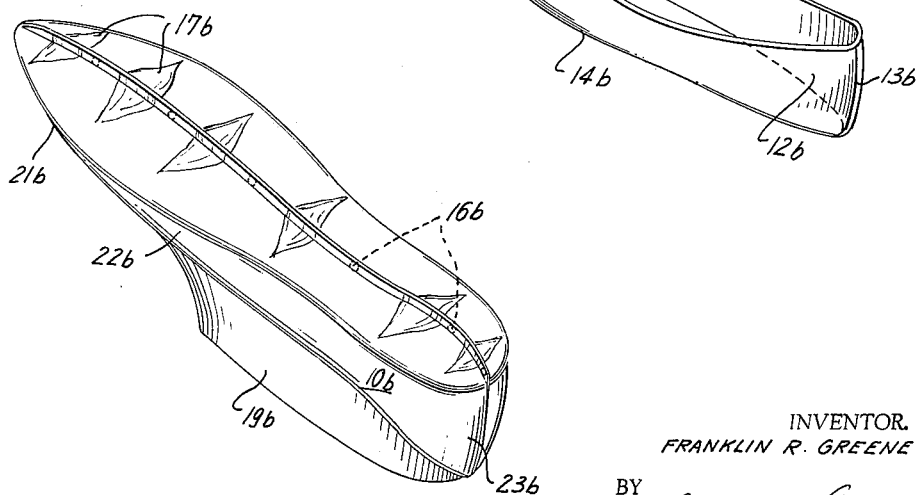
INVENTOR.
FRANKLIN R. GREENE
BY
*Myron Amer*
ATTORNEY

United States Patent Office 3,221,353
Patented Dec. 7, 1965

3,221,353
METHODS OF SHOE MANUFACTURE USING A RADIO FREQUENCY DIELECTRIC HEATER
Franklin R. Greene, New York, N.Y.
(142—33 59th Ave., Flushing 55, N.Y.)
Filed July 31, 1961, Ser. No. 128,010
2 Claims. (Cl. 12—142)

The present invention relates to methods of manufacturing a shoe using an upper and a lower which are both comprised of heat fusable material.

An object of the invention is to effect the joinder of the upper to the lower solely by heat fusion.

Another object is to take advantage of this method of joining the upper to the lower to greatly simplify the shaping of the shoe upper.

Still another object is to shape the lower while joining it by heat fusion to the upper.

Various other objects and advantages will appear from the following description of several embodiments of the invention, and the novel features will be particularly pointed out hereinafter in connection with the appended claims.

The present invention includes in its scope the following important features: In contemplation of joining the upper to the lower by heat fusion, the upper may be first formed from a flat web state into an envelope having the general shape of a shoe. In obtaining this shaped envelope, select edges of the upper are joined together, and in particular a seam connection is made in the bottom of the resulting envelope. This envelope is then placed on a last, much the same way one puts on a sock, and in this simple manner the envelope has a desired shoe shape imparted to it. Following this, the lower is placed in face to face contact against the bottom portion of the upper which has the seam, and these contacting portions of the upper and lower are then heated to a softened state where they fuse together, and at the same time the bottom seam (which represents an unevenness in the upper) is effectively smoothed out. In other words, not only is a fused connection made between the upper and lower, but any unevenness in the bottom of the upper, which may be a seam of a preshaped envelope as in the example given above, or may be excess material of the upper which is gathered to the bottom of the last in order to conform the remainder of the upper to the shape of the last, is smoothed out simultaneously with the fusing of the upper to the lower. This ability to smooth out any unevenness in the bottom of the upper greatly facilitates the shaping of the upper on the last and permits as has been indicated the use of a pre-shaped envelope.

In addition to smoothing while fusing the portions of the upper and lower in face to face contact with each other, as indicated above, the present invention also includes in its scope the modification of the lower from a flat to a conventional shape having an arch curvature.

In the drawings:

FIG. 1 is a plan view of a shoe upper, in the flat;

FIG. 2 is a perspective view of a generally shoe shaped envelope formed of the upper of FIG. 1;

FIG. 3 is a view of the envelope of FIG. 2 in position on a shaping last, in perspective, to more particularly illustrate the bottom of the envelope;

FIG. 4 is a front view of what is shown in FIG. 3, and additionally of heat fusing apparatus illustrated diagramatically;

FIG. 5 is a view, in section, along lines 5—5 of FIG. 4;

FIG. 6 is a front view similar to FIG. 4, and illustrating another embodiment of the present invention, and lustrating another embodiment of the present invention, and further including a phatom perspective of certain portions of the heat fusing apparatus and of the materials being modified by this apparatus;

FIG. 7 is a perspective view most similar to FIG. 2, and illustrating another form of a shoe upper in process; and FIG. 8 is a perspective view of the upper of FIG. 7 in position on a shaping last.

The methods of the present invention contemplate the use of a wide variety of heat fusable materials. These materials as regards the upper may include, but is not solely to be limited to, either so called "supported" or "unsupported" vinyl web material, and as regards the lower may include, but again is not solely to be limited to, various gauges of vinyl sheeting. For purposes of illustration only, it is more particularly stated that it is preferred that the upper consist of a composite web material of vinyl combined with vinyl foam which is commercially available under the identifying trademark "Neotex" from Harte and Company of New York City, and that the lower consist of a .070 inch thick composite sheet of rigid vinyl laminated between two pieces of flexible vinyl which is commercially available from Kaycor Company of Trenton, New Jersey.

It is further mentioned that the term "lower," which is used above and also in the description and claims which follow, is intended to have the broad meaning of denoting any shoe component (whether it be an inner sole, an outer sole, or some other such shoe component) which is conventionally joined to an upper in the manufacture of a shoe.

Referring now to the method of the invention illustrated in FIGS. 1–5, in FIG. 1 an upper, designated by the numeral 10, is shown in the flat as die cut or otherwise removed from a flat web of heat fusable material (not shown). In the flat, the upper 10 has a generally triangular front portion 11 and two elongated side portions 12. In FIG. 2 it is shown how the upper 10 is formed into a shoe shaped envelope, more particularly designated 10' in FIG. 2. This is done by connecting, as for example by heat fusion, the ends 13 of the elongated side portions 12 and also the peripheral edge 14 of the upper. Thus, the upper 10 is formed into the shaped envelope 10' which closely conforms in shape to the shape required in the upper in the final product, but this invariably results in some unevenness, in the form of a seam 16 and possibly also in the form of transverse wrinkles 17 in the bottom of the envelope 10'. To a great extent the wrinkles 17 may be eliminated by cutouts 18 in the peripheral edge 14 (only one such cutout being illustrated in FIGS. 1–3) but the bottom seam 16 or its equivalent is not so readily avoidable.

As best shown in FIGS. 3–5, the envelope 10' is next placed over a conventional shoe-shaped last 19, in much the same way that one puts on a sock, and the last fills out the envelope 10' to impart to it the desired shoe shape which it is required to have in the final product. Unlike shaping techniques of the prior art, no substantial working, as for example, by pulling and stretching of the upper is required in order that it be made to closely conform to the shape of the last. In other words, in the pre-shaping of the upper 10 into the envelope 10', the excess material of the upper is in effect gathered into the bottom seam 16, so that the front, side and back portions 21, 22 and 23, respectively, of the upper neatly take the shape of the last 19.

Following the placement of the upper 10 (in the form of the shaped envelope 10') on the last 19, and as best shown in FIG. 4, an appropriately shaped lower 24 which may have a cemented rubber heel 26 is placed in face to face contact against the bottom portion 27 of the upper 10 which has the seam 16. Next, the contacting surfaces 28 and 29 of the upper and lower respectively, are sufficiently heated so that these surfaces soften and flow together to form a fused connection, and then the heat source is removed to permit solidification of this fused connection. In FIG. 5, the fusion of these surfaces, which serves as the sole means of attachment of the upper 10 to the lower 24, is designated by the numeral 31, and it further is shown that the unevenness, as exemplified by the bottom seam 16, which existed prior to fusing in the bottom of the upper 10 has effectively been smoothed out by the heat fusing operation.

The preferred manner of heating the surfaces 28 and 29 is by high frequency dielectric heating. Thus, the bottom of the last 19 is preferably made of aluminum as is a shaped die 32 placed over the lower 24, and as diagrammatically shown in FIG. 4 both the last and die are connected by conductors 33 to a high frequency generator 34. In a manner well understood, the generator 34 functions to rapidly change the polarity of the magnetic field induced in the space gap between the last 19 and die 32, and the surfaces 28 and 29 are heated to a suitably softened state by the internal friction of the molecule movement occurring in the heat fusable material with each change in polarity. Instead of dielectric heating, so called physical heat may also be used to soften the surfaces 28 and 29, and in this instance the last and die would be equipped with suitable heating coils. It is also possible to use a combination of dielectric and physical heat. It is preferred that the heat fusing operation be conducted under pressure and to this end the die 32 is mounted on a piston arm 36 of a conventional air cylinder.

Referring now to FIG. 6, a variation in method is illustrated, which uses however substantially the same apparatus as is shown in FIG. 4. According to this method, simultaneously with the fusing of the upper 10a to the lower 24a, the lower 24a is modified from a flat state to a shape having an appropriately curved arch 37. Thus, as shown in phantom perspective in FIG. 6, the lower 24a is flat when first placed over the envelope 10'a, and is subsequently molded into shape between the shaped die 32a and the matching shaped bottom of the last 19a. In this regard, the flexible lower 24a is initially forced by movement of the die 32a in the direction of the arrow A to assume the shape having an arch curve 37, but following the softening and subsequent solidification of the lower 24a it permanently takes on this shape. As in the case of the previously described method, the method just described also contemplates a smoothing out of any unevenness in the bottom of the upper 10a simultaneously with the fusing of the upper 10a to the lower 24a.

In FIGS. 7 and 8, still another method within the scope of the present invention is illustrated. According to this method, the upper 10b has only the ends 13b of its elongated side portions 12b joined together, but otherwise the upper is not formed into a shaped envelope. The upper 10b is then placed on the last 19b and the excess material of the upper is manually gathered to the bottom of the last 19b resulting in the front, side and back portions 21b, 22b and 23b, respectively, of the upper taking the shape of the last 19b. This excess material, for ease of subsequent handling, may then be held in the gathered state either by a series of adhesive or heat fused seals, as indicated by the reference numeral 16b. As in the cases of the previous methods described, a lower is then heat fused to the upper 10b and simultaneously with this fusing operation there is a smoothing out of the excess material which exists in an uneven state along the bottom of the upper 10b. This method therefore does not require the care which according to prior art methods must be exercised to avoid unevenness in excess material gathered to the bottom of the shaping last. Thus, even without resorting to first forming the upper into a shaped envelope, the task of shaping the upper on a last is greatly simplified and facilitated by the joining of the upper to the lower by heat fusion, and accordingly even a method of manually shaping an upper on a last as just described will be appreciated as being within the scope of the present invention.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. In the manufacture of a shoe having a shaped upper and a sole attached along the bottom of said upper, the improved method of simultaneously providing a permanent shoe shape to said upper while attaching the sole thereto using a radio frequency dielectric heater having at least two electrodes of which one said electrode is provided with the shoe shape that it is desired to impart to said upper, which improved method includes forming said upper, comprised of material having at least one thermoplastic surface, into an envelope having a shoe shape approximating the desired shoe shape to be imparted to said upper, placing said envelope over said shoe shaped electrode, with said thermoplastic surface outward, such that said envelope is conformed in shape to the shape of said shoe shaped electrode and excess material in said envelope exists along the bottom of said electrode, placing a sole, comprised of thermoplastic material, between said opposing electrodes and in position for attachment to and along the bottom of said upper, said sole being coextensive with the bottom of the upper and covering the excess material on said bottom and bringing said sole and the bottom of said upper into surface contact under pressure by movement of at least one of said electrodes towards the other while subjecting said sole and upper surfaces in contact to a dielectric field established between said electrodes, whereby the contacting surfaces of said sole and upper unite into a substantially smooth surfaced fused attachment of one to the other and the shape of said shoe shaped electrode is permanently imparted to said upper.

2. The method as claimed in claim 1 wherein the surfaces of said opposing electrodes which face each other are provided with an arch shape and simultaneously with the shaping of the upper and the attachment of the sole thereto an arch shape is imparted to said sole.

References Cited by the Examiner
UNITED STATES PATENTS

| 2,228,136 | 1/1941 | Hart | 156—273 X |
| 2,298,037 | 10/1942 | Crandell | 156—273 X |
| 2,371,571 | 3/1945 | Crandell | 12—142 |
| 2,385,523 | 9/1945 | Marasco | 12—142 |
| 3,021,543 | 2/1962 | Crowley | 12—142 |

JORDAN FRANKLIN, *Primary Examiner.*

EARL M. BERGERT, FRANK J. COHEN, *Examiners.*